(12) United States Patent
Schultz et al.

(10) Patent No.: US 12,006,467 B2
(45) Date of Patent: Jun. 11, 2024

(54) COMPOSITIONS OF APHRON SEALING LOST CIRCULATION SPACER

(71) Applicant: SELECT CHEMISTRY, LLC, Houston, TX (US)

(72) Inventors: Garrett Schultz, Spring, TX (US); Jordan Clark, Tomball, TX (US)

(73) Assignee: SELECT CHEMISTRY, LLC, Houston, TX (US)

( * ) Notice: Subject to any disclaimer, the term of this patent is extended or adjusted under 35 U.S.C. 154(b) by 218 days.

(21) Appl. No.: 17/984,823

(22) Filed: Nov. 10, 2022

(65) Prior Publication Data

US 2023/0167351 A1 Jun. 1, 2023

Related U.S. Application Data

(60) Provisional application No. 63/284,868, filed on Dec. 1, 2021.

(51) Int. Cl.
| | |
|---|---|
| *C09K 8/514* | (2006.01) |
| *C09K 8/00* | (2006.01) |
| *C09K 8/50* | (2006.01) |
| *C09K 8/504* | (2006.01) |

(52) U.S. Cl.
CPC ........... *C09K 8/501* (2013.01); *C09K 8/00* (2013.01); *C09K 8/5045* (2013.01); *C09K 8/514* (2013.01); *C09K 2208/04* (2013.01); *C09K 2208/08* (2013.01)

(58) Field of Classification Search
CPC ........ C09K 8/501; C09K 8/00; C09K 8/5045; C09K 8/514; C09K 2208/04; C09K 2208/08; C09K 8/508; C09K 8/516; C09K 8/40
See application file for complete search history.

(56) References Cited

U.S. PATENT DOCUMENTS

| | | | |
|---|---|---|---|
| 3,629,102 | A | 12/1971 | Lummus et al. |
| 4,422,948 | A | 12/1983 | Corley et al. |
| 4,498,995 | A | 2/1985 | Gockel |
| 6,123,159 | A | 9/2000 | Brookey et al. |
| 6,770,601 | B1 | 8/2004 | Brookey |
| 6,852,676 | B1 | 2/2005 | Chatterji et al. |
| 9,951,264 | B2 | 4/2018 | Penny et al. |
| 10,280,358 | B2 | 5/2019 | Burts, Jr. et al. |
| 10,858,569 | B2 | 12/2020 | Pernites et al. |
| 2001/0027880 | A1 | 10/2001 | Brookey |
| 2004/0211563 | A1 | 10/2004 | Brookey et al. |
| 2012/0267107 | A1 | 10/2012 | Benkley et al. |
| 2013/0137609 | A1 | 5/2013 | Pierce et al. |
| 2018/0265763 | A1 | 9/2018 | Leotaud et al. |
| 2019/0016947 | A1* | 1/2019 | Mahmoud ............... C09K 8/74 |
| 2020/0140740 | A1 | 5/2020 | Leotaud et al. |
| 2020/0190389 | A1 | 6/2020 | Pernites et al. |
| 2021/0024809 | A1* | 1/2021 | Ba Geri ............... C09K 8/032 |
| 2021/0309907 | A1 | 10/2021 | Patil et al. |

FOREIGN PATENT DOCUMENTS

WO WO-2011083318 A1 * 7/2011 ............... C09K 8/12

OTHER PUBLICATIONS

International Search Report and Written Opinion issued in PCT application No. PCT/US2022/049576, dated Mar. 8, 2023 (9 pages).
Mirataine CBS Product Safety Data Sheet (Rhodia) Nov. 2008; pp. 1-2; p. 1.
Mirataine bet C-30 Product Safety Data Sheet (Rhodia) Feb. 2008; p. 1; p. 1.

* cited by examiner

*Primary Examiner* — Kumar R Bhushan
(74) *Attorney, Agent, or Firm* — Ewing & Jones, PLLC

(57) ABSTRACT

A spacer fluid includes an aphron generating component, a polymer, a lost circulation material, and a weighting agent component.

13 Claims, No Drawings

COMPOSITIONS OF APHRON SEALING LOST CIRCULATION SPACER

CROSS-REFERENCE TO RELATED APPLICATIONS

This application is a nonprovisional application which claims priority from U.S. provisional application No. 63/284,868, filed Dec. 1, 2021, which is incorporated by reference herein in its entirety.

BACKGROUND

Field

The disclosure relates generally to spacer fluids for improved lost circulation control and well integrity.

Background Art

In a well cementing operation, casing and liners may be cemented in wellbores. For example, cement may be pumped into an annulus between the exterior surface of casing or liner and the walls of the wellbore or interior walls of casing. The cement may then harden in the annulus. The cement may act to prevent migration of fluids in the annulus.

Drilling fluids such as mud may be present in wells when cementing a casing into a borehole with the cement slurry. Mud and cement are often incompatible and traditionally it is desirable to restrict contact between the mud and cement through use of a cement spacer. Spacer systems traditionally serve to water-wet the wellbore surfaces to promote bonding of the cement sheath to the wellbore and casing.

SUMMARY

In an embodiment, a spacer fluid includes an aphron generating component, a polymer, a lost circulation material, and a weighting agent component.

DETAILED DESCRIPTION

The following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

This disclosure is not limited to the embodiments, versions, or examples described, which are included to enable a person having ordinary skill in the art to make and use the disclosed subject matter when the information contained herein is combined with existing information and technology.

Further, various ranges and/or numerical limitations may be expressly stated below. It should be recognized that unless stated otherwise, it is intended that endpoints are to be interchangeable. Further, any ranges include iterative ranges of like magnitude falling within the expressly stated ranges or limitations. For example, if the detailed description recites a range of from 1 to 5, that range includes all iterative ranges within that range including, for instance, 1.3-2.7 or 4.9-4.95.

Certain embodiments of the present disclosure are directed to spacer fluids including aphrons. As used herein, "aphrons" are bubbles approximately 10-150 microns in diameter. Aphrons have the structure of "one core, two layer, and three membranes". The gas core of the aphron may be encapsulated by an aqueous protective shell. The aphron may be generated in the spacer fluid through the use of a surfactant, hereinafter an "aphron generating component." Examples of aphron generating components include, but are not limited to, alcohol ethoxylates, alcohol ethoxysulfates, alkyl phenol ethoxylates, olefin sulfonates (such as alpha olefin sulfonates), alkyl betaines, glycol ethers, and any combination thereof or derivatives. In certain embodiments, the alkyl betaines are selected from the group consisting of cocamidopropyl betaine, laurel betaine, and cocamidopropyl hydroxysultaine. Spacer fluids containing aphrons, as shown in the examples, may allow for reduced lost circulation and weighting material concentrations while maintaining lost circulation control properties, and in combination a greater sealing performance than the sum of its parts. In some embodiments, the aphron generating component may contain a combination of aphron generating components such as a combination of alkyl betaine and alpha-olefin sulfonates. In those embodiments, for example the ratio of alkyl betaine to alpha-olefin sulfonates may be between 1:1 and 1:4, or between 1:3 and 1:4, or about 1:3.4.

In addition to the aphron generating component, the spacer fluid may include a lost circulation component. The lost circulation component may be of sustainable origin, such as corn cob hulls or fiber, cotton burr, walnut shells, peanut shells, coconut choir or shells, kenaf fiber and any combinations thereof. In certain embodiments, the lost circulation component may act as a carrier for the aphron generating compound. In such embodiments, the amount of aphron generating component in the spacer fluid may be between 0.1-30% by weight of the lost circulation component. In certain embodiments, the aphron-generating component may be used to pre-coat the lost circulation component prior to mixing with the remaining components of the spacer fluid.

The spacer fluid may also include a polymer. In certain aspects of the present disclosure, the polymer may be a biopolymer, such as a polysaccharide. Examples of such polysaccharides include xanthan, diutan, welan, schleroglucan, carrageenan, or any combination thereof.

In addition, the spacer fluid may include a weighting agent such as sodium bentonite, barite, calcium carbonate, magnesium carbonate, or any combination thereof.

In certain embodiments, the spacer fluid may be blended as a solid composite.

Example

Example formulas, weighted with barite to a selected density, were run for API static fluid loss to determine sealing capabilities. Formulas I and VI were run to establish base line sealing properties of the selected polysaccharide. Formulas II and VII established the improvements in sealing properties utilizing sodium bentonite weighting material and plant fiber lost circulation materials, specifically corn cob fiber.

Formulas IV and IX establish little or no improvement utilizing aphron generating surfactants and stabilizer in the baseline formulas, shown in Table 1 and Table 3.

TABLE 1

Example Formulas I-IV API Static Fluid Loss Results at 175° F.

| Formula | I | II | III | IV |
|---|---|---|---|---|
| Barite (ppb) | 192.5 | 192.5 | 192.5 | 192.5 |
| Diutan Gum (ppb) | 0.25 | 0.25 | 0.25 | 0.25 |
| Corn Cob Fiber (ppb) | — | 7 | 7 | — |
| Sodium Bentonite (ppb) | — | 7 | 7 | — |
| Alpha Olefin Sulfonate (ppb) | — | — | 0.48 | 0.48 |
| Cocamidopropyl Hydroxysultaine (ppb) | — | — | 0.14 | 0.14 |
| Density (ppg) | 12 | 12 | 12 | 12 |
| Fluid Loss (ml/30 mins) | 906 | 168 | 149 | 963 |

Formulas III and VIII, established the addition of the aphron generating surfactants to the example formulas II and VII improved sealing capabilities, shown in Table 1 and Table 3. Example formula V compared sealing properties of the spacer composite if the aphron generating surfactants were pre-coated on the plant fiber lost circulation material, allowed to dry, prior to dry component composite mixing and API mixing. A notable reduction in surfactant foam generation during API mixing and equal sealing performance establishes an advantage to pre-coating the aphron generating surfactants onto solid carriers, shown in Table 2.

TABLE 2

Pre-coated Aphron Generating Surfactant Comparison API Fluid Loss at 175° F.

| Formula | III | V |
|---|---|---|
| Barite (ppb) | 192.5 | 192.5 |
| Diutan Gum (ppb) | 0.25 | 0.25 |
| Corn Cob Fiber (ppb) | 7 | 7* |
| Sodium Bentonite (ppb) | 7 | 7 |
| Alpha Olefin Sulfonate (ppb) | 0.48 | 0.48* |
| Cocamidopropyl Hydroxysultaine (ppb) | 0.14 | 0.14* |
| Density (ppg) | 12 | 12 |
| Fluid Loss (ml/30 mins) | 149 | 149 |
| Comments | Immediate foaming during mixing | *Corn Cob Fiber pre-coated with aphron generating surfactants Foaming delayed during mixing |

TABLE 3

Example Formulas VI-IX API Static Fluid Loss Results at 175° F.

| Formula | VI | VII | VIII | IX |
|---|---|---|---|---|
| Barite (ppb) | 192.5 | 192.5 | 192.5 | 192.5 |
| Diutan Gum (ppb) | 0.4 | 0.4 | 0.4 | 0.4 |
| Corn Cob Fiber (ppb) | — | 7 | 7 | — |
| Sodium Bentonite (ppb) | — | 7 | 7 | — |
| Alpha Olefin Sulfonate (ppb) | — | — | 0.48 | 0.48 |
| Cocamidopropyl Hydroxysultaine (ppb) | — | — | 0.14 | 0.14 |
| Density (ppg) | 12 | 12 | 12 | 12 |
| Fluid Loss (ml/30 mins) | 375 | 132 | 103 | 408 |

Though the addition of aphron generating surfactants showed no improvement over the base line formula VI, the combination of aphron generating surfactants and lost circulation materials improved tested sealing properties. Formula X reduced the weighting and plant fiber lost circulation material concentrations by 50%, resulting in similar sealing properties of formula VII having no aphron generating surfactants and double the sealing material components. Aphron generating surfactants allow for greatly reduced sealing material concentrations to achieve similar sealing performance, and in combination a greater sealing performance than the sum of its parts, shown in Table 4.

TABLE 4

Effect of Aphron Generating Surfactants on Fibrous Material API Fluid Loss at 175° F.

| Formula | VII | VIII | X |
|---|---|---|---|
| Barite (ppb) | 192.5 | 192.5 | 192.5 |
| Diutan Gum (ppb) | 0.4 | 0.4 | 0.4 |
| Corn Cob Fiber (ppb) | 7 | 7 | 3.5 |
| Sodium Bentonite (ppb) | 7 | 7 | 3.5 |
| Alpha Olefin Sulfonate (ppb) | — | 0.48 | 0.48* |
| Cocamidopropyl Hydroxysultaine (ppb) | — | 0.14 | 0.14* |
| Density (ppg) | | 12 | 12 |
| Fluid Loss (ml/30 mins) | 132 | 103 | 130 |

The invention claimed is:

1. A spacer fluid comprising:
   an aphron generating component;
   an aphron, the aphron being a bubble between 10 and 150 microns in diameters; the aphron having a structure of one core, two layers, and three membranes;
   a polymer;
   a lost circulation material; and,
   a weighting agent component.

2. The spacer fluid of claim 1, wherein the aphron generating component is an alcohol ethoxylate, an alcohol ethoxysulfate, an alkyl phenol ethoxylate, an olefin sulfonates, an alkyl betaine, a glycol ether, or a combination thereof or a derivative thereof.

3. The spacer fluid of claim 2, wherein the aphron generating component is an alpha olefin sulfonate.

4. The spacer fluid of claim 2, wherein the alkyl betaines is selected from the group consisting of cocamidopropyl betaine, lauryl betaine, and cocamidopropyl hydroxysultaine.

5. The spacer fluid of claim 2, wherein the aphron generating component is a combination of an alkyl betaine and an alpha-olefin sulfonate.

6. The spacer fluid of claim 5, wherein the ratio of alkyl betaine to alpha-olefin sulfonate is between 1:1 and 1:4.

7. The spacer fluid of claim 2, wherein the lost circulation material is plant fiber selected from the group consisting of corn cob hulls or fiber, cotton burr, walnut shells, peanut shells, coconut coir or shells, kenaf fiber and combinations thereof.

8. The spacer fluid of claim 7, wherein the amount of aphron generating component in the spacer fluid is between 0.1-30% by weight of the lost circulation material.

9. The spacer fluid of claim 8, wherein the aphron-generating component is used to pre-coat the lost circulation component prior to mixing with the remaining components of the spacer fluid.

10. The spacer fluid of claim 1, wherein the polymer is a polysaccharide.

11. The spacer fluid of claim 10, wherein the polysaccharide is xanthan, diutan, welan, schlerogucan, carrageenan, or any combination thereof.

12. The spacer fluid of claim 1, wherein the weighting agent is sodium bentonite, barite, calcium carbonate, magnesium carbonate, or any combination thereof.

13. The spacer fluid of claim 1, wherein the spacer fluid is blended as a solid composite.

* * * * *